(12) United States Patent
Yu et al.

(10) Patent No.: US 10,974,197 B2
(45) Date of Patent: Apr. 13, 2021

(54) CLOSED-ENVIRONMENT AIR PURIFICATION SYSTEM

(71) Applicant: Hamilton Sundstrand Corporation, Charlotte, NC (US)

(72) Inventors: Ping Yu, West Hartford, CT (US); Benjamin Elmer Bishop, South Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 477 days.

(21) Appl. No.: 15/834,749

(22) Filed: Dec. 7, 2017

(65) Prior Publication Data
US 2019/0143269 A1 May 16, 2019

Related U.S. Application Data

(60) Provisional application No. 62/585,759, filed on Nov. 14, 2017.

(51) Int. Cl.
*B01D 53/86* (2006.01)
*B01J 35/00* (2006.01)
(Continued)

(52) U.S. Cl.
CPC ....... *B01D 53/864* (2013.01); *B01D 53/8671* (2013.01); *B01D 53/8696* (2013.01);
(Continued)

(58) Field of Classification Search
CPC .............. B01D 53/864; B01D 53/8671; B01D 53/8696; B01D 2257/406; B01D 2257/80;
(Continued)

(56) References Cited

U.S. PATENT DOCUMENTS

| | | | | |
|---|---|---|---|---|
| 4,828,683 A | * | 5/1989 | Gardner | C10G 65/04 208/216 R |
| 5,501,801 A | * | 3/1996 | Zhang | B01J 19/122 210/748.14 |

(Continued)

FOREIGN PATENT DOCUMENTS

| | | |
|---|---|---|
| EP | 0745419 | 12/1996 |
| EP | 1040870 | 10/2000 |

(Continued)

OTHER PUBLICATIONS

European Search Report for European Patent Application No. 18205253.0 completed Mar. 6, 2019.

(Continued)

*Primary Examiner* — Regina M Yoo
(74) *Attorney, Agent, or Firm* — Carlson, Gaskey & Olds, P.C.

(57) ABSTRACT

An article includes a closed-environment air purification system that has a purifier through which air can be recirculated. The purifier is capable at a temperature of equal or less than 35° C. of converting hydrogen in the air to water and converting carbon monoxide in the air to carbon dioxide. The purifier has a reactor bed that includes media comprised of support particles and a metal catalyst disposed on the support particles.

7 Claims, 2 Drawing Sheets

(51) Int. Cl.
*B01J 35/02* (2006.01)
*B01J 35/04* (2006.01)
B63G 8/00 (2006.01)
B01J 23/42 (2006.01)
B01J 23/52 (2006.01)
B01J 23/44 (2006.01)
B01J 23/72 (2006.01)
B01J 23/34 (2006.01)
B64G 1/48 (2006.01)

(52) U.S. Cl.
CPC ......... *B01J 35/0006* (2013.01); *B01J 35/026* (2013.01); *B01J 35/04* (2013.01); B01D 2255/106 (2013.01); B01D 2255/1021 (2013.01); B01D 2255/1023 (2013.01); B01D 2255/1026 (2013.01); B01D 2255/2073 (2013.01); B01D 2255/20761 (2013.01); B01D 2255/92 (2013.01); B01D 2257/108 (2013.01); B01D 2257/406 (2013.01); B01D 2257/502 (2013.01); B01D 2257/70 (2013.01); B01D 2257/80 (2013.01); B01D 2258/06 (2013.01); B01D 2259/4566 (2013.01); B01D 2259/4575 (2013.01); B01J 23/34 (2013.01); B01J 23/42 (2013.01); B01J 23/44 (2013.01); B01J 23/52 (2013.01); B01J 23/72 (2013.01); B63G 8/00 (2013.01); B64G 1/48 (2013.01)

(58) Field of Classification Search
CPC ........ B01D 2255/92; B01D 2259/4575; B01D 2258/06; B01D 2259/4566; B01D 2257/70; B01D 2257/502; B01D 2257/108; B01D 2255/2073; B01D 2255/20761; B01D 2255/1026; B01D 2255/1023; B01D 2255/106; B01D 2255/1021; B01J 35/04; B01J 35/026; B01J 35/0006; B01J 23/34; B01J 23/72; B01J 23/44; B01J 23/52; B01J 23/42; B64G 1/48; B63G 8/00
See application file for complete search history.

(56) References Cited

U.S. PATENT DOCUMENTS

| | | | | |
|---|---|---|---|---|
| 5,541,147 | A * | 7/1996 | Friedlander | B01D 53/945 502/100 |
| 6,048,509 | A | 4/2000 | Kawai et al. | |
| 6,463,925 | B2 * | 10/2002 | Nuckols | F23C 13/00 126/208 |
| 7,117,079 | B2 * | 10/2006 | Streichsbier | F01N 9/002 701/114 |
| 8,569,549 | B2 * | 10/2013 | Weiner | B01J 35/1019 568/885 |
| 8,686,194 | B2 * | 4/2014 | Macht | B01J 35/023 568/449 |
| 2002/0159215 | A1 * | 10/2002 | Siess | B03C 3/00 361/232 |
| 2007/0116090 | A1 * | 5/2007 | Park | B01J 8/008 374/208 |
| 2009/0238744 | A1 | 9/2009 | Chigapov et al. | |
| 2012/0258013 | A1 | 10/2012 | Nalette et al. | |
| 2014/0224721 | A1 * | 8/2014 | Panizza | C02F 3/342 210/263 |
| 2015/0057149 | A1 | 2/2015 | Yang | |
| 2017/0001175 | A1 | 1/2017 | Li et al. | |
| 2017/0320811 | A1 * | 11/2017 | Yan | B01J 23/44 |
| 2018/0001296 | A1 * | 1/2018 | Holbrook | B01J 20/28011 |

FOREIGN PATENT DOCUMENTS

FR 2690357 10/1993
GB 2166061 4/1986

OTHER PUBLICATIONS

Partial European Search Report for European Patent Application No. 18205253.0 completed Mar. 6, 2019.

* cited by examiner

CLOSED-ENVIRONMENT AIR PURIFICATION SYSTEM

BACKGROUND

This disclosure relates to catalysts and, more specifically, a catalyst in a purifier of a closed-environment system.

Closed systems operate without air exchange with the surrounding environment. As examples, spacecraft, submarines, environmentally sealed "safe house," extra-terrestrial habitat, and the like may operate for extended periods of time without the ability to exchange outside air. During that period of time, the air may collect undesired gases, such as hydrogen and carbon monoxide. Such gases can be emitted from onboard machinery, humans, food cooking, batteries, oxygen generator, fuel reformer, or other devices and must be removed to maintain safe, breathable air.

An air purifier reactor, often called as hydrogen-carbon monoxide burner, is used to remove hydrogen and carbon monoxide. The reactor typically includes a catalyst that operates at temperatures in excess of 550-600° F. in order to obtain the catalytic activity necessary to convert the hydrogen to water and the carbon monoxide to carbon dioxide.

SUMMARY

An article according to an example of the present disclosure includes a closed-environment air purification system that has an air line for circulating air and a purifier disposed in the air line and through which the air flows. The purifier is capable at a temperature of equal or less than 35° C. of converting hydrogen in the air to water and converting carbon monoxide in the air to carbon dioxide. The purifier has a reactor bed that includes media comprised of support particles and a metal catalyst disposed on the support particles.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
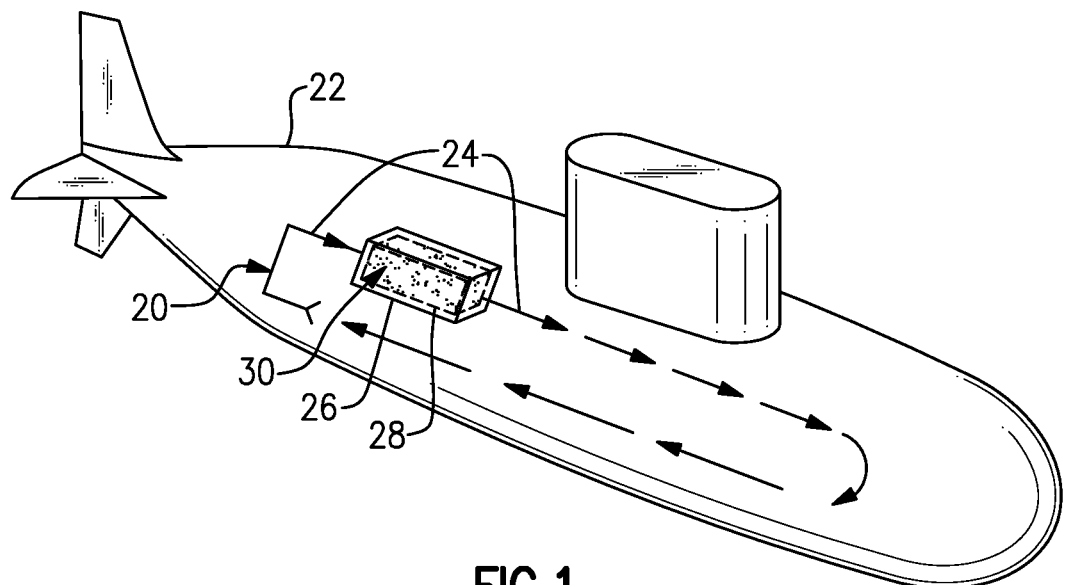
FIG. 1 illustrates an example closed-environment air purification system.

FIG. 1 schematically illustrates a closed-environment air purification system 20 ("system 20"). In this example, the system 20 is in a submarine 22. Although not limited to these examples, it is to be understood that the system 20 may also be used in spacecraft, an environmentally sealed "safe house," an extra-terrestrial habitat, or other types of closed-environments. As used herein, the term "closed-environment" refers to a contained or sealed environment that does not exchange air with its surrounding environment for long periods of time. Thus, the system 20 is a purification system that is in such an environment and which does not exchange air with the surrounding environment. The system 20 or portions thereof may also be installed within an existing flow stream used to process the closed-system atmosphere that can accommodate a flow rate consistent with the need for carbon dioxide removal for the crew (typically flow rates of 3-4 ACFM per crew person).

The system 20 may include an air line 24 for circulating air. Although not shown, the air line 24 may be outfitted with fans, valves, vents, ducts, and the like for air intake and air discharge from the system 20.

Figure 2A:
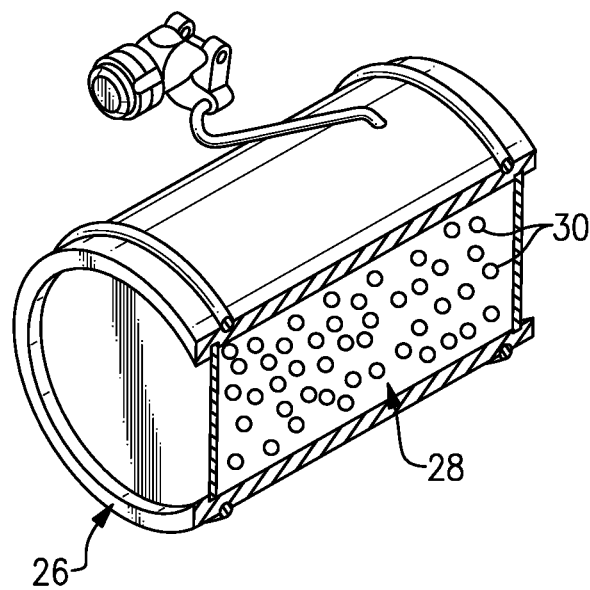
FIG. 2A illustrates an example of a purifier as used in FIG. 1.

The system 20 further includes a purifier 26, also depicted in FIG. 2A, that is situated in the air line 24. The system 20 takes air in and the air circulates through the purifier 26 for treatment of hydrogen and carbon monoxide. In this regard, the purifier 26 is capable at a temperature of equal or less than 35° C. of converting hydrogen in the air to water and converting carbon monoxide in the air to carbon dioxide. Conversion of hydrogen and carbon monoxide at this relatively low temperature avoids the need for high-temperature conversion as in burner reactor systems. At high temperatures in such systems, there can be undesired side reactions involving organic hydrocarbons in the air. The system 20, which excludes high temperature burners or heaters and operates at much lower temperature, reduces or eliminates those side reactions. The purifier 26 may also be incorporated in the outlet stream of an existing carbon dioxide removal system or other air processing system (e.g. air conditioner) by replacing an existing outlet filter, or by inclusion within ducting to the outlet filter from existing process beds ($CO_2$ sorbent or other filtration, dehumidification, or other trace contaminate control systems).

Figure 2B:
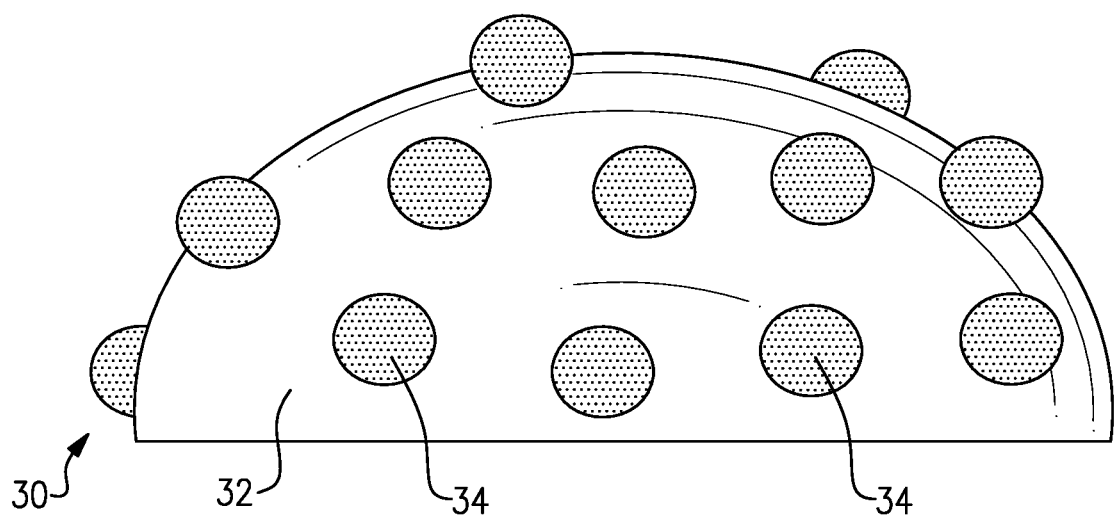
FIG. 2B illustrates an example of media that has a support particle and a metal catalyst.

The purifier 26 has a reactor bed 28 that includes media 30 for treating the hydrogen and carbon monoxide. FIG. 2B shows a representative view of the media 30. The media 30 is comprised of catalyst support 32 having at least one of carbon material, polymeric material, or metal oxide in the form of granular particle or monolith with a plurality of pores, and a metal catalyst 34 disposed on the catalyst support 32. For instance, the metal catalyst 34 is comprised of particles of metal that are attached to the catalyst support 32.

The metal catalyst 34 is selected from platinum, gold, palladium, ruthenium, copper, manganese and combinations, or their oxides thereof. The catalyst support 32 is formed of at least one of carbon material, polymeric material, or metal oxide. Example of carbon material can be an activated carbon and example of metal oxide can be alumina, silica, titanium oxide, or cerium oxide. The polymeric material may be polymethyl methacrylate. The catalyst support if in granular shape has size of 4 to 40 mesh and pore volume of between 0.1 and 0.6 cubic centimeter per cubic centimeter of support material. The metal catalyst 34 is capable of converting hydrogen to water and converting carbon monoxide to carbon dioxide at the temperature of equal or less than 35° C. In one further example, the media 30 has 2%-30% by weight of the metal catalyst 34.

The purifier 26 is relatively compact, low-power, and simplified in comparison to reactors that require high temperatures and burners. The compactness can also be represented by performance metrics. For example, the reactor bed 28 has a gas hourly space velocity (GHSV) of 28,800 $hr^{-1}$ to 288,000 $hr^{-1}$ and both hydrogen and carbon monoxide conversion efficiencies are at 90% and above at 1-2% hydrogen concentration and 10-100 ppm carbon monoxide concentration. Higher GHSVs are possible depending upon the maximum generation rate and frequency of generation (or generation profile) of the trace contaminants of hydrogen or carbon monoxide. Sizing of the reactor bed is a function of these two parameters. High GHSV operation permits the purifier to be relatively small, which coupled with its low pressure drop allows it to be easily integrated into an existing system. A typical size for a nuclear submarine may be about 7 inches long and 4 inches in diameter, replacing existing burners approximately 40"×40"×60". A typical size low temperature reactor for a 6 crewmember space vehicle may be about 2 inches in diameter and less than 1.5 inches in length. As will be appreciated, the size will also depend on system packaging and performance requirements as noted above.

Figure 3:
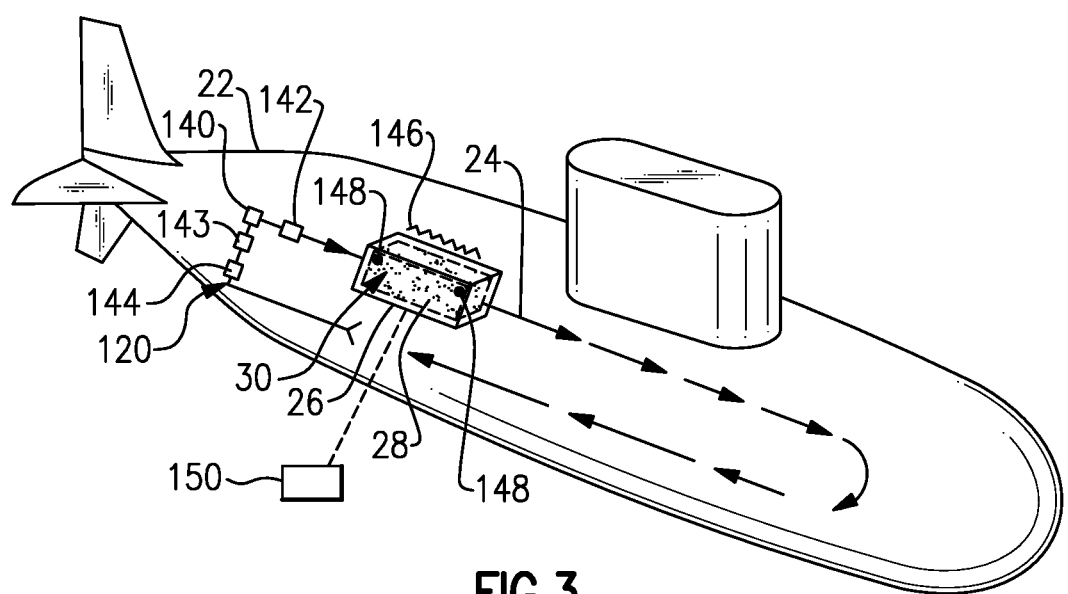
FIG. 3 illustrates another example of a closed-environment air purification system.

The GHSV is simply the ratio of the volumetric process air flow per hour divided by the reactor's flow volume containing the catalytic material. FIG. 3 illustrates a more comprehensive example closed-environment air purification system 120. The system 120 is similar to the system 20 but additionally includes a temperature sensor 140, an ammonia filter 142, a charcoal filter bed 143 for higher order hydrocarbons not decomposed by the purifier 26, and a dehumidifier 144, each situated in the air line 24. The temperature sensor 140, dehumidifier 144, charcoal filter 143, and ammonia filter 142 are located upstream of the purifier 26. The purifier 26 includes a small heater to manage potential condensate within the purifier. However, exothermic reactions may increase the temperature of the passing air and provide sufficient heat to prevent condensation once operation begins. A second temperature sensor integral with the purifier 26 may be used to control startup conditions and provide operational feedback on the reaction rates within the purifier 26. While dehumidifier 144 provides a flow stream of dry air through the purifier 26, which facilitates conversion of hydrogen and carbon monoxide into water and carbon dioxide When humidity is a concern, a low wattage heater 146 may be used to periodically warm the catalyst 34 prior to operation, to drive off water that may have accumulated in the catalyst 34.

One or more internal temperature sensors 148 may also be used, in combination with a controller 150, to monitor internal temperature at the catalyst 34, during operation and/or after shutdown. Since there is potential for condensation to have formed during non-operational periods, this is factored into the control algorithms. The controller 150 can utilize the internal temperature (and/or humidity) to responsively control operation of the heater 146 to meet temperature or humidity thresholds to manage local condensation either at startup or during operation. The heat drives off liquid water within the catalyst 34, providing "seamless" light-off at startup and enhancing overall performance at low hydrogen concentrations.

Since the system is a closed loop, the dehumidifier 144 may also be used to remove water from the air leaving the purifier. For example, the conversion of hydrogen to water results in an increase in the moisture level of the air. The dehumidifier removes at least a portion of the moisture so that the air has a moisture level that is below a predetermined threshold.

The ammonia filter 142 may be used to remove ammonia from air before it enters the purifier. The ammonia may be poisoning to the purifier, and the ammonia filter 142 thus serves to limit ammonia exposure. This option would be dependent upon potential ammonia sources other than humans within the enclosed environment. In most instances, normal de-humidification removes virtually all metabolically generated ammonia, and the ammonia filter would be unnecessary.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
a closed-environment air purification system including a purifier disposed in an air line and through which air can be recirculated, the purifier being capable at a temperature of equal or less than 35° C. of converting hydrogen in the air to water and converting carbon monoxide in the air to carbon dioxide, the purifier having one or more internal temperature sensors and a reactor bed including media comprised of a catalyst support and a metal catalyst disposed on the catalyst support, a temperature sensor disposed in the air line upstream of the purifier, and an ammonia filter disposed in the air line upstream of the purifier.

2. The article as recited in claim 1, wherein the metal catalyst is selected from the group consisting of platinum, gold, palladium, copper, manganese, and combinations or their oxides thereof.

3. The article as recited in claim 2, wherein the media has 2% to 30% by weight of the metal catalyst.

4. The article as recited in claim 3, wherein the catalyst support is formed of at least one of carbon material, polymeric material, or metal oxide.

5. The article as recited in claim 4, wherein if the catalyst support is the metal oxide, the metal oxide is selected form the group consisting of alumina, silica, titanium oxide, cerium oxide, and combinations thereof, if the catalyst support is the polymeric material, the polymeric material is polymethyl methacrylate, and if the catalyst support is the carbon material, the carbon material is activated carbon.

6. The article as recited in claim 5, wherein the catalyst support is granular and has a particle size of 4 to 40 mesh and a pore volume of 0.1 to 0.6 cubic centimeters per cubic centimeter of support material.

7. The article as recited in claim 1, further comprising a dehumidifier disposed in the air line upstream of the purifier.

* * * * *